US012666423B2

(12) United States Patent
Wei et al.

(10) Patent No.: US 12,666,423 B2
(45) Date of Patent: Jun. 23, 2026

(54) ENHANCING HANDOVER PERFORMANCE USING RADIO RESOURCE CONTROL DIVERSITY

(71) Applicant: Sony Group Corporation, Tokyo (JP)

(72) Inventors: Yuxin Wei, Basingstoke (GB); Hideji Wakabayashi, Basingstoke (GB); Shinichiro Tsuda, Basingstoke (GB); Brian Alexander Martin, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 41 days.

(21) Appl. No.: 17/516,714

(22) Filed: Nov. 2, 2021

(65) Prior Publication Data

US 2022/0061042 A1 Feb. 24, 2022

Related U.S. Application Data

(63) Continuation of application No. 16/324,577, filed as application No. PCT/EP2017/070521 on Aug. 11, 2017, now Pat. No. 11,212,780.

(30) Foreign Application Priority Data

Aug. 11, 2016 (EP) ..................................... 16183716

(51) Int. Cl.
H04W 72/20 (2023.01)
H04B 7/024 (2017.01)
H04W 36/00 (2009.01)

(52) U.S. Cl.
CPC ............ H04W 72/20 (2023.01); H04B 7/024 (2013.01); H04W 36/0055 (2013.01)

(58) Field of Classification Search
CPC ......... H04W 72/0406; H04W 36/0055; H04W 8/20; H04W 36/0072; H04W 28/08; H04W 28/16; H04W 48/08; H04B 7/024
See application file for complete search history.

(56) References Cited

U.S. PATENT DOCUMENTS

2014/0056376 A1* 2/2014 Guo ..................... H04B 7/0404
                                                          375/267
2014/0080422 A1 3/2014 Guo et al.
(Continued)

FOREIGN PATENT DOCUMENTS

CN          105165057 A     12/2015
CN          105191402 A     12/2015
(Continued)

OTHER PUBLICATIONS

3GPP, "Technical Specification Group Radio Access Network; Evolved Universal Terrestrial Radio Access (E-UTRA); Study on Small Cell Enhancements for E-UTRA and E-UTRAN—Higher layer aspects", 3GPP TR 36.842 V0.1.1 Release 12, May 2013, pp. 1-39.

(Continued)

*Primary Examiner* — Lan N Moore
*Assistant Examiner* — Latresa A Mccallum
(74) *Attorney, Agent, or Firm* — XSENSUS, LLP

(57) ABSTRACT

A base station for a mobile telecommunications system has circuitry, which is configured to communicate with at least one user equipment and at least another base station. The circuitry is further configured to configure a radio resource control message for radio resource control diversity, and transmit the configured radio resource control message to the user equipment or to receive a configured radio resource control message from the user equipment and the at least another base station.

19 Claims, 10 Drawing Sheets

(56) References Cited

U.S. PATENT DOCUMENTS

| | | | |
|---|---|---|---|
| 2014/0335872 A1 | 11/2014 | Yamada | |
| 2014/0342748 A1* | 11/2014 | Zou | H04W 28/16 |
| | | | 455/452.1 |
| 2015/0223095 A1 | 8/2015 | Centonza et al. | |
| 2015/0341918 A1 | 11/2015 | Yang et al. | |
| 2015/0358957 A1 | 12/2015 | Kim et al. | |
| 2015/0365872 A1 | 12/2015 | Dudda et al. | |
| 2016/0088530 A1 | 3/2016 | Uchino | |
| 2016/0088537 A1 | 3/2016 | Uchino et al. | |
| 2016/0088538 A1 | 3/2016 | Uchino et al. | |
| 2016/0192323 A1 | 6/2016 | Kim et al. | |
| 2017/0013519 A1 | 1/2017 | Hahn et al. | |
| 2017/0164419 A1* | 6/2017 | Kim | H04W 76/28 |
| 2019/0191410 A1* | 6/2019 | Kim | H04W 48/12 |

FOREIGN PATENT DOCUMENTS

| | | |
|---|---|---|
| CN | 105453652 A | 3/2016 |
| JP | 2016-509791 A | 3/2016 |
| JP | 2016-525850 A | 8/2016 |
| WO | WO-2015060860 A1 | 4/2015 |

OTHER PUBLICATIONS

Ericsson, "Tight integration of the New Radio interface (NR) and LTE: Control Plane design", 3GPP TSG-RAN WG2 Meeting No. 93bis Tdoc R2-162753, Dubrovnik Croatia, Apr. 11-15, 2016, pp. 1-5.

KT Corporation, "RAN interworking between NR and LTE", 3GPP TSG-RAN WG2 Meeting No. 93bis R2-162965, Dubrovnik Croatia, Apr. 11-15, 2016, pp. 1-2.

RAN 2 Meeting No. 93, "Email discussions after RAN2#93" pp. 1-4.

Mediatek Inc., "Performance of Control Plane Diversity", 3GPP TSG-RAN2 Meeting No. 83 R2-132469, Barcelona, Spain, Aug. 19-23, 2013, pp. 1-9.

Samsung, "On the RRC diversity", 3GPP TSG RAN WG2 Meeting No. 83 R2-132615, Barcelona Spain Aug. 19-23, 2013, pp. 1-2.

International Search Report mailed on Oct. 27, 2017 for PCT/EP2017/070521 filed on Aug. 11, 2017, 11 pages.

Ericsson, Overview of RRC architecture options for the LTE-NR tight interworking online, 3GPP TSG-RAN WG2#94 R2-164005, Internet<URL. http://www.3gpp.org/ftp/tsg_ran/WG2_RL2/TSGR2_94/Docs/R2-164005.zip>, May 13, 2016. pp. 1-5.

* cited by examiner

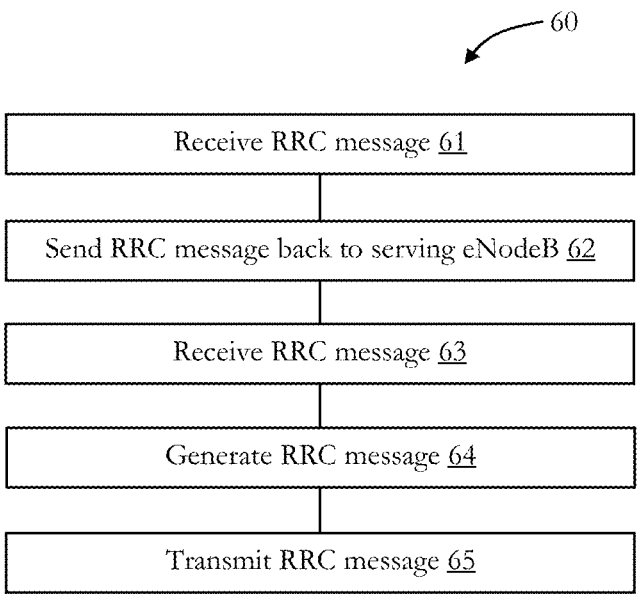

60

Receive RRC message 61

Send RRC message back to serving eNodeB 62

Receive RRC message 63

Generate RRC message 64

Transmit RRC message 65

Fig. 6

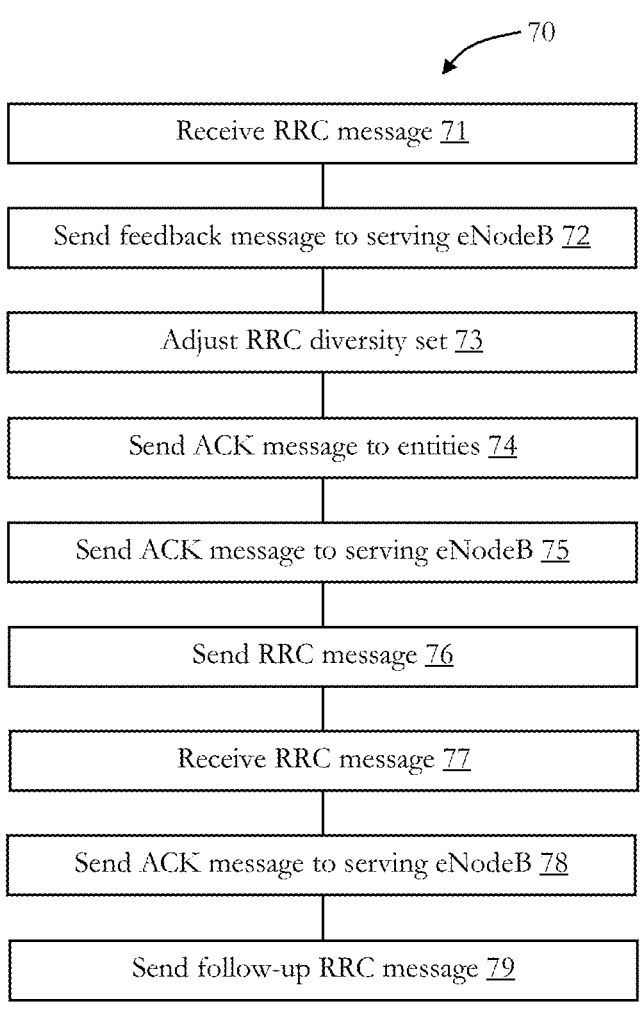

70

Receive RRC message 71

Send feedback message to serving eNodeB 72

Adjust RRC diversity set 73

Send ACK message to entities 74

Send ACK message to serving eNodeB 75

Send RRC message 76

Receive RRC message 77

Send ACK message to serving eNodeB 78

Send follow-up RRC message 79

Fig. 7

ENHANCING HANDOVER PERFORMANCE USING RADIO RESOURCE CONTROL DIVERSITY

CROSS-REFERENCE TO RELATED APPLICATIONS

This application is a continuation of U.S. application Ser. No. 16/324,577, filed Feb. 11, 2019, which is based on PCT filing PCT/EP2017/070521, filed Aug. 11, 2017, and claims priority to 16183716.6, filed in the European Patent Office on Aug. 11, 2016, the entire contents of each of which are being incorporated herein by reference.

TECHNICAL FIELD

The present disclosure generally pertains to a base station, user equipment and mobile telecommunications system method which employ radio resource control diversity.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies. LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on NR. In this concept a cell is served by a user equipment (UE), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been done in accordance with introduction of the IP Multimedia System (IMS) for LTE, and a physical separation between control plane and user plane has been proposed as a possible solution for 5G. Since requirements for the control plane are, for example, robustness and wide coverage so as to maintain the service continuity, a macro or anchor base station should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell or the like should be able to take over responsibilities, which are typically done, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell or the other NR stations or entities mentioned above, are, for example, radio resource management, radio resource control (RRC) connection control, etc.

In 5G, there are in general two operational modes, the tight interworking mode and standalone mode. In the tight interworking mode, a 5G NR eNodeB should work together with a LTE eNodeB, e.g. via dual connectivity or carrier aggregation. The LTE eNodeB will work as an anchor eNodeB for the 5G NR eNodeB. In a standalone mode, the 5G NR eNodeB could work independent from the assistance of the LTE eNodeB.

In 3GPP document R2-162965, "RAN interworking between NR and LTE", 3GPP TSG-RAN WG2 Meeting #93bis, Dubrovnik, Croatia, 11th-15th April, 2016, a protocol architecture of 5G user and control planes are presented. In this architecture, control signaling of NR RAN (Radio Access Network) is transferred via LTE data bearer, which could re-use existing LTE procedures with minimized modifications.

In 3GPP document R2-162753, "Tight integration of the New Radio interface (NR) and LTE: Control Plane design", 3GPP TSG-RAN WG2 #93bis, Dubrovnik, Croatia, 11-15 Apr. 2016, a dual RRC is proposed in which two separate RRC entities, e.g. LTE eNodeB and NR eNodeB, can generate RRC messages to the UE. Control-plane diversity can be provided by means of PDCP (Packet Data Convergence Protocol) level split and combining. Local configuration of lower layers is possible. The coordination of RRM (Radio Resource Management) functions between NR and LTE RATs may be required.

Furthermore, RRC diversity was proposed in Rel-12 dual connectivity. It was proposed to enhance the handover performance. In 3GPP document TR 36.842, "3rd Generation Partnership Project; Technical Specification Group Radio Access Network; Study on Small Cell enhancements for E-UTRA and E-UTRAN; Higher layer aspects (Release 12)", with RRC diversity, the handover related RRC signaling could additionally be transmitted from or to a potential target cell. Radio link failure (RLF) could in this case be prevented as long as the UE is able to maintain a connection to at least one of the cells.

Although there exist techniques for providing signaling for radio resource control diversity, it is generally desirable to improve the existing techniques.

SUMMARY

According to a first aspect, the disclosure provides a base station for a mobile telecommunications system comprising circuitry configured to communicate with at least one user equipment and at least another base station, wherein the circuitry is further configured to configure a radio resource control message for radio resource control diversity; and transmit the configured radio resource control message to the user equipment or to receive a configured radio resource control message from the user equipment and the at least another base station.

According to a second aspect, the disclosure provides a user equipment for a mobile telecommunications system comprising circuitry configured for radio resource control diversity communication, wherein the circuitry is further configured to receive or transmit at least two radio resource control messages, which are configured for radio resource control diversity communication.

According to a third aspect, the disclosure provides a mobile telecommunications system method for providing a radio resource control connection to a user equipment, wherein the mobile telecommunications system comprises at least two cells, wherein the first cell is based on a first radio access technology and the second cell is based on a second radio access technology, the method comprising transmitting a first radio resource control message from the first cell to the user equipment; transmitting a second radio resource control message from the second cell to the user equipment; and providing the radio resource control connection based on at least one of the first radio resource control message and the second radio resource control message.

Further aspects are set forth in the dependent claims, the following description and the drawings.

BRIEF DESCRIPTION OF THE DRAWINGS

Embodiments are explained by way of example with respect to the accompanying drawings, in which:

FIG. 6 illustrates a flowchart for a further mobile telecommunications system method;

FIG. 7 illustrates a flowchart for a further mobile telecommunications system method;

DETAILED DESCRIPTION OF EMBODIMENTS

Figure 1:
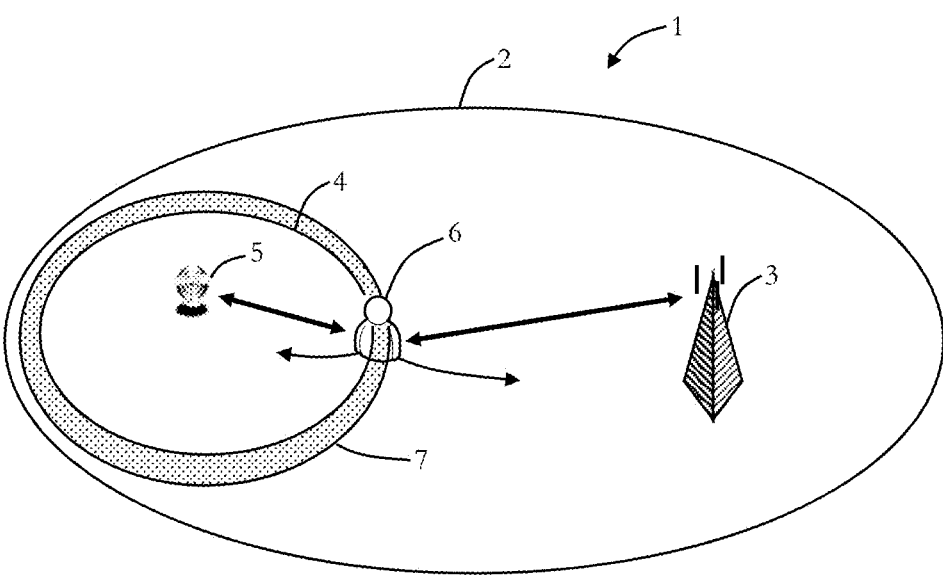
FIG. 1 illustrates an embodiment of a radio access network with a LTE eNodeB and a NR eNodeB.

Before a detailed description of the embodiments under reference of FIG. 1 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on NR. In this concept a cell is served by a user equipment (UE), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been done in accordance with introduction of the IP Multimedia System (IMS) for LTE, and a physical separation between control plane and user plane has been proposed as a possible solution for 5G. Since requirements for the control plane can be, for example, robustness and wide coverage so as to maintain the service continuity, a macro or anchor base station should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations or entities in the function as a virtual cell, local cell, micro or pico cell or the like should be able to take over responsibilities, which are typically done, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell or the other NR stations or entities mentioned above, are, for example, radio resource management, radio resource control (RRC) connection control, etc.

In 5G, there are in general two operational modes, which may also be implemented in embodiments of the present disclosure, the tight interworking mode and standalone mode. In the tight interworking mode, a 5G NR eNodeB should work together with a LTE eNodeB, e.g. via dual connectivity or carrier aggregation. The LTE eNodeB may work as an anchor eNodeB for the 5G NR eNodeB. In a standalone mode, the 5G NR eNodeB could work independent from the assistance of the LTE eNodeB.

In 3GPP document R2-162965, "RAN interworking between NR and LTE", 3GPP TSG-RAN WG2 Meeting #93bis, Dubrovnik, Croatia, 11th-15th April, 2016, a protocol architecture of 5G user and control planes are presented. In this architecture, control signaling of NR RAN (Radio Access Network) is transferred via LTE data bearer, which could re-use existing LTE procedures with minimized modifications.

In 3GPP document R2-162753, "Tight integration of the New Radio interface (NR) and LTE: Control Plane design", 3GPP TSG-RAN WG2 #93bis, Dubrovnik, Croatia, 11-15 Apr. 2016, a dual RRC is proposed in which two separate RRC entities, e.g. LTE eNodeB and NR eNodeB, can generate RRC messages to the UE. Control-plane diversity can be provided by means of PDCP (Packet Data Convergence Protocol) level split and combining. Local configuration of lower layers is possible. The coordination of RRM (Radio Resource Management) functions between NR and LTE RATs may be required in some embodiments.

Furthermore, RRC diversity was proposed in Rel-12 dual connectivity. It was proposed to enhance the handover performance. In 3GPP document TR 36.842, "3rd Generation Partnership Project; Technical Specification Group Radio Access Network; Study on Small Cell enhancements for E-UTRA and E-UTRAN; Higher layer aspects (Release 12)", with RRC diversity, the handover related RRC signaling could additionally be transmitted from or to a potential target cell. Radio link failure (RLF) could, in this case, be prevented as long as the UE is able to maintain a connection to at least one of the cells.

Consequently, some embodiments pertain to a base station, a user equipment and a mobile telecommunications system method, as will also be discussed in the following. The base station and the user equipment each have a circuitry which is configured to perform a method and the mobile telecommunications system method may include the methods as performed by the circuitry of the user equipment and of the base station.

The base station for a mobile telecommunications system has circuitry configured to communicate with at least one user equipment and at least another base station, wherein the circuitry is further configured to configure a radio resource control message for radio resource control diversity, and transmit the configured radio resource control message to the user equipment and/or to receive a configured radio resource control message from the user equipment and the at least another base station. Of course, the transmission of the configured radio resource control message may include also the transmission of two or even more radio resource control messages, to the user equipment and/or to the at least another base station. Furthermore, the radio resource control messages for diversity may be the same or they may be different from each other. For instance, a first radio resource control message may differ from a second resource control message although they are associated to each other. The circuitry of the base station and the user equipment, respectively, may include hardware components which are necessary for performing the methods described herein.

The base station may be based on the principles of LTE (LTE-A) and/or it may be based on NR RAT, as also discussed above. The base station may be based on the known eNodeB of LTE, as one example, or it may be based on the discussed NR eNodeB. The user equipment may be, for example, a mobile phone, smartphone, a computer, tablet, tablet personal computer or the like including a mobile communication interface, or any other device which is able to perform a mobile telecommunication via, for example, LTE or NR, such as a hot spot device with a mobile communication interface, etc.

The at least another base station may also be based on the principles of LTE (LTE-A) and/or it may be based on NR RAT, as also discussed above.

In some embodiments, the base station and the at least another base station may be based on different RATs, e.g. the base station may be a LTE base station, e.g. a LTE eNodeB, and the at least another base station may be a NR eNodeB, or vice versa, i.e. the base station may be a NR base station, e.g. a NR eNodeB, and the at least another base station may be a LTE eNodeB.

The base station and the at least another base station may be configured for RRC diversity communication, as will also be explained in the following.

The radio resource control message may be associated with at least one of: handover (e.g. RRCConnectionRecon-figuration, measurement reporting or the like), radio resource control establishment (e.g. RRCConnectionSetup, RRCConnectionSetupComplete or the like), radio resource control re-establishment (e.g. RRCConnnectionReestablish-mentRequest, RRCConnectionReestablishment or the like), radio resource control connection suspend and radio resource control connection resume.

The circuitry may be further configured to turn on/off the radio resource control diversity or to turn on/off the radio resource control diversity for specific radio resource control messages, e.g. based on the configured radio resource con-trol message, e.g. such that the RRC diversity is only turned on for specific RRC messages (handover commands, RRC-ConnectionSetup, etc.).

The circuitry may be further configured to turn on/off the radio resource control diversity, e.g. based on the function-alities of radio resource control messages, e.g. such that the RRC diversity is only turned on for RRC connection estab-lishment procedure, or RRC connection suspend/resume procedure.

The circuitry may be further configured to turn on/off the radio resource control diversity, based on the user equipment to which the configured radio resource control message is transmitted. For instance, the UE may turn on RRC diver-sity, if it wants to establish an RRC connection, in cases where the UE is located at a boundary of a serving base station, or the like.

The circuitry may be further configured to transmit an instruction message to the user equipment for turning on/off radio resource control diversity or for turning on/off the radio resource control diversity for specific radio resource control messages, such that the UE may turn on/off the RRC diversity generally or for specific radio resource control messages.

Hence, more generally, the radio resource control diver-sity may also be turned on/off for specific radio resource control messages such that, for example, for specific radio resource control messages radio resource control diversity is used and for others not.

The radio resource control diversity may be initiated, based on an uplink reference signal measurement, wherein the radio resource control diversity may be performed for a downlink communication or an uplink communication. The circuitry may be further configured to configure the user equipment for sending at least one of feedback signals and uplink reference signals, e.g. for performing uplink refer-ence signal measurement. The circuitry may be further configured to define a radio resource control configuration, based on the received at least one of feedback signals and uplink reference signals.

The radio resource control diversity may be initiated, based on a downlink reference signal measurement, wherein the radio resource control diversity is performed for an uplink communication or a downlink communication.

The circuitry may be further configured to determine at least one of a downlink radio resource control diversity set and an uplink radio resource control diversity set. The downlink/uplink RRC diversity set may include, for example, indications for the base stations (e.g. LTE and NR eNodeBs) which are involved in the RRC diversity com-munication with the UE.

The circuitry may be further configured to determine the downlink radio resource control diversity set based on a downlink quality or to determine the uplink radio resource control diversity set based on an uplink quality. Hence, the RRC diversity set may include the base stations which have the best link quality.

The configured radio resource control message may include at least one of original radio resource control mes-sage generator identifier and additional radio resource con-trol transmitter identifier. The original RRC message gen-erator identifier may identify which base station originally has generated the RRC message. The additional RRC trans-mitter identifier may indicate which additional base stations transmit the configured RRC message.

The circuitry may be further configured to transmit the configured radio resource control message repeatedly. This may be implemented based on a timer. The repeated trans-mission of the configured radio resource control message may be set in response to receipt of a predetermined mes-sage, e.g. a radio resource control message. Hence, upon receipt of the RRC message from the UE, the base station may start the timer for repeated RRC diversity message transmission, while in other embodiments the timer is imple-mented in the user equipment and the timer is started upon transmission and/or receipt of a RRC message.

The repeated transmission may be terminated in response to a predetermined event, which is, for example, a finished handover procedure or any other procedure or behavior which is finished and/or which indicates that further RRC messages are not needed at the moment from the UE.

The repeated transmission may be terminated after a predetermined time period. For instance, the timer may only run for a predetermined time period and after the predeter-mined time period is over, the process is terminated.

The repeated transmission may be initiated in response to a received radio resource control message, wherein the repeated transmission may be terminated in response to another received radio resource control message. For example, the UE transmits a first RRC message and the repeated transmission is initiated and after some time, the UE transmits a second RRC message and the repeated transmission is terminated.

In some embodiments, a timer is started after transmission of the configured radio resource control message. The timer may be implemented in the base station and/or in the UE. The timer may expire after a predetermined time period. After expiration, a predetermined action may be performed, e.g. the UE will enter an RRC_IDLE state or the like. The timer may be stopped in response to a received RRC message (e.g. from the user equipment and/or the at least another base station).

The circuitry may be further configured, in case that the base station does not serve the user equipment, to transmit a received radio resource control message to another base station serving the user equipment. Hence, thereby it may be ensured that the serving base station receives the respective RRC message sent from the UE.

The circuitry may be further configured, in case that the base station does not serve the user equipment, to transmit an acknowledgement message to another base station serv-ing the user equipment in response to a radio resource control message received from a user equipment. Thereby, it may be ensured that the serving base station is informed that the user equipment has received the configured RRC mes-sage.

The circuitry may be further configured to receive a configured radio resource control message from another base station and to transmit a common radio resource control message. Hence, in some embodiments, the configured RRC message is only transmitted by one base station and the configured RRC message includes information included in the received configured radio resource control message.

The common radio resource control message may be transmitted based on at least one of the following conditions: link quality, coverage, mobility state of the user equipment. Hence, for example, in cases where the link quality is bad, the coverage is small or the mobility state of the user equipment is high for a base station, the common control message is transmitted by a base station for which the link quality is better, the coverage is larger and/or the mobility state of the UE fits better. In other embodiments, the common RRC message may be transmitted by all base stations which have a similar link quality, coverage and/or mobility state.

As mentioned, some embodiments pertain to a user equipment for a mobile telecommunications system comprising circuitry configured for radio resource control diversity communication, wherein the circuitry is further configured to receive and/or transmit at least two radio resource control messages, which are configured for radio resource control diversity communication. The RRC message may be transmitted by a base station and the at least another base station, as discussed above or the RRC message is transmitted to the base station and the at least another base station. The circuitry may be further configured to turn on/off the radio resource control diversity communication, based on an instruction message received from a base station, as discussed above. The circuitry may be further configured to turn on/off the radio resource control diversity communication, based on a radio resource control establishment, e.g. the RRC diversity communication is turned on in the case that RRC establishment is performed. The circuitry may be further configured to turn on/off the radio resource control diversity communication, if the user equipment is located at a cell boundary. Hence, for example, if it is detected that the UE is at a cell boundary (coverage boundary) or the like, RRC diversity may be turned on. The circuitry may be further configured to run on/off the radio resource control diversity communication, if a radio link failure is detected. The circuitry may be further configured to receive the at least two radio resource control messages based on a radio resource control diversity set received from a base station. As discussed above, the RRC diversity may include a list of base stations which transmit the configured RRC messages. The circuitry may be further configured to transmit a radio resource control message including at least one of a target radio resource control receiver identifier and additional radio resource control receiver identifier. The target RRC receiver identifier may indicate a base station which shall receive the message from the UE and the additional RRC receiver identifier may indicate which additional base station shall receive the message. The circuitry may be further configured to transmit an acknowledgment message in response to receiving the radio resource control messages, as also indicated above. The acknowledgment message may include at least one of an indication about the type of received radio resource control messages and an indication about the origin of the received radio resource control messages.

In some embodiments, the employed RRC diversity provides robustness, flexibility as well as scalability. As discussed, in some embodiments, the RRC diversity is implemented in other dedicated signaling besides handover command.

Returning to FIG. 1, there is illustrated a RAN 1 which has a macro cell 2, which is established by a LTE eNodeB 3, and a pico cell 4, which is established by a NR eNodeB 5.

A UE 6 can communicate with the LTE eNodeB 3 and, as long it is within the pico cell 4 it can also communicate with the NR eNodeB 5. In a transition region 7, which is also covered by the pico cell 4, the UE 6 may perform handover to the LTE eNodeB 3, for example, in the case that it leaves the pico cell 4 coverage. On the other hand, in cases where it travels into the pico cell 4 coverage, the UE 6 may perform handover to the NR eNodeB 5.

As discussed above, in some embodiments, not only during handover, but generally during RRC communication, RRC diversity may be employed such that, for example, RRC messages are transmitted from both the LTE eNodeB 3 and the NR eNodeB 5 to the UE 6 and/or such that RRC messages are transmitted from the UE 6 to both, the LTE eNodeB 3 and the NR eNodeB 5.

In the following, an embodiment of a mobile telecommunications method 20 is discussed under reference of FIG. 2 which pertains to RRC diversity messages and which can be performed by the LTE eNodeB 3, the NR eNodeB 5 and the UE 6 of FIG. 1.

Theoretically, RRC diversity could be applied to all RRC messages. But, in some embodiments, unnecessary RRC diversity operation leads to radio resource wastage and imposes a burden on eNodeB-eNodeB and radio interfaces.

Figure 2:
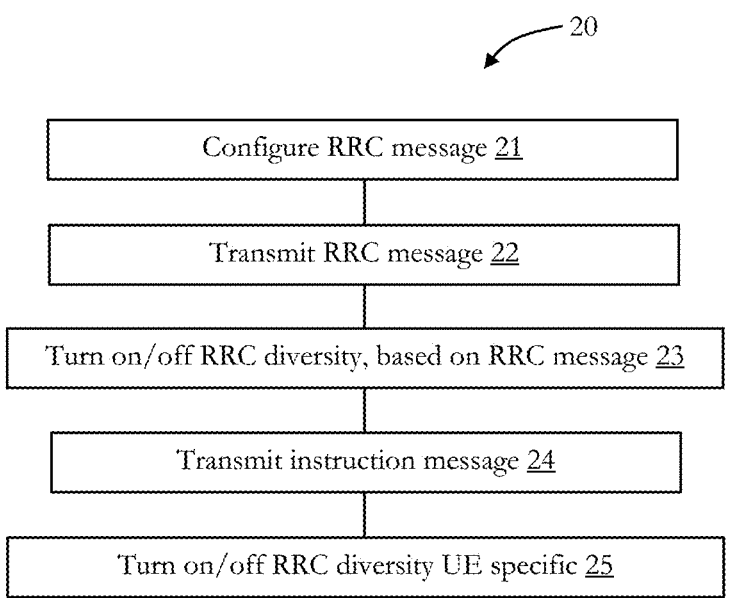
FIG. 2 illustrates a flowchart for a mobile telecommunications system method.

Accordingly, the method 20 of FIG. 2 includes at 21, which may be performed by the LTE eNodeB 3 and/or the NR eNodeB 5, to configure a RRC message for RRC diversity which may be at least one of the following:

1. A handover related message, such as RRCConnectionReconfiguration, measurement reporting, etc.
2. A RRC connection establishment message, such as RRCConnectionSetup, RRCConnectionSetupComplete, etc.
3. A RRC connection re-establishment message, such as RRCConnectionReestablishmentRequest, RRCConnectionReestablishment, etc.
4. A RRC connection suspend/resume message.

At 22, the respective configured message is transmitted to the UE 6.

At 23, the RRC diversity may be turned on/off by sending a single RRC or other instruction message at 24 to the UE 6. Turning on/off of RRC diversity may be RRC message specific. For example, turning on/off of RRC diversity may only be applicable for a handover command, or it may be RRC message group based, e.g. RRC connection establishment message group based, such that the LTE eNodeB 3 and/or the NR eNodeB 5 decides, based on the configured RRC message to be sent, whether the RRC diversity is turned on or off.

At 25, the turning on/off of the RRC diversity is UE specific. For example, only the UE 6 that wants to establish the RRC connection will turn on the RRC diversity. In another example, the turning on/off is UE group specific, for example, only the UE group which is located at a control node boundary, e.g. UE 6 in the transition/boundary region 7, will turn on the RRC diversity. The turning on/off of RRC diversity at 25 may also be UE specific in the sense that all UEs which are within the range of a specific data node/control node (e.g. served by NR eNode B 5) turn on the RRC diversity. The turning on/off of the RRC diversity at 25 may also be UE specific in the sense that all UEs that are experiencing an RLF (radio link failure) will turn on the RRC diversity automatically.

Figure 3:
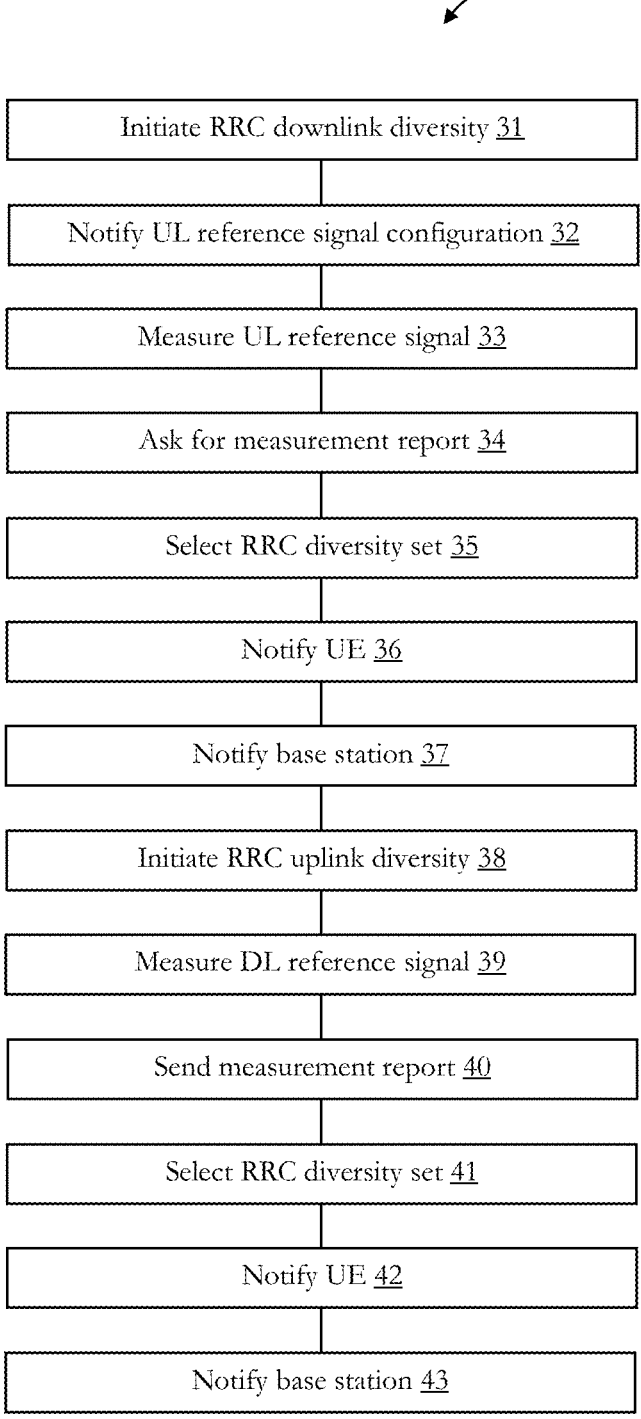
FIG. 3 illustrates a flowchart for a further mobile telecommunications system method.

In the following, an embodiment of a mobile telecommunications method 30 is discussed under reference of FIG. 3 which pertains to triggering RRC diversity and which can be performed by the LTE eNodeB 3, the NR eNodeB 5 and the UE 6 of FIG. 1. Method 30 can be combined with method 20.

At 31, RRC diversity is initiated for a downlink RRC connection, based on an uplink reference signal measurement.

The uplink reference signal measurement may include the following:

1) At 32, a control unit, e.g. LTE eNodeB 3 or NR eNodeB 5 or any other node, will notify the UL reference signal configuration of the UE, e.g. UE 6, to its data units, e.g. one of the eNodeBs 3 or 5, as well as to the neighbor control unit (e.g. other eNodeB of a neighboring LTE or NR cell), in particular, in cases where the UE moves to the boundary of two control units, such as in the region 7 in FIG. 1 where the UE 6 is in the coverage area of LTE eNodeB 3 and NR eNodeB 5. The UL reference signal configuration can be pre-configured or it may be configured on demand.

2) At 33, the serving and neighbor data units and/or control units, e.g. eNodeBs 3 and 5 in FIG. 1, will measure the UL reference signal from UE 6.

3) At 34, if the serving data unit, e.g. NR eNodeB 5, detects a radio link deterioration of a certain UE, such as UE6, it will ask for the measurement report from neighboring data units, e.g. LTE eNodeB 3, of this UE, e.g. UE 6.

4) At 35, the serving data unit, e.g. NR eNodeB 5, will select e.g. the best neighbor data unit/data units, e.g. LTE eNodeB 3, as the RRC diversity set and notifies at 36 the UE, e.g. UE 6, of the RRC diversity set and possibly about RRC messages to be sent with RRC diversity. If the UE wants to send uplink RRC messages with RRC diversity, the UE will notify the same at 37 to the serving unit (base station), e.g. NR eNodeB 5, as well.

Hence, the UL reference signal measurement is suitable to initiate the RRC diversity for a downlink RRC connection. In other embodiments, the UL reference signal measurement is used for initiating an uplink RRC connection.

At 38, RRC diversity is initiated for an uplink RRC connection, based on a downlink reference signal measurement.

The downlink reference signal measurement may include the following:

1) The UE, e.g. UE 6, will measure the downlink reference signal at 39 of a serving data unit, e.g. NR eNodeB 5, as well as neighbor data units, e.g. LTE eNodeB 3, as configured by serving data unit and/or control unit.

2) Once the downlink radio link deteriorates, the UE, e.g. UE 6, will send a measurement report at 40 to its serving data unit or control unit (e.g. LTE eNodeB 3 and/or NR eNodeB 5), similar like handover trigger.

3) According to the measurement report, the serving data unit or control unit (e.g. LTE eNodeB 3 and/or NR eNodeB 5) will select the neighbor data unit/units with the best radio quality as the RRC diversity set at 41 and notifies at 42 the UE of the RRC diversity set and possibly RRC messages to be sent with RRC diversity. If the UE wants to send uplink RRC messages with RRC diversity, the UE will notify the same at 43 to the serving unit (e.g. base station 3 or 5) as well.

Hence, the DL reference signal measurement is suitable to initiate the RRC diversity for an uplink RRC connection. In other embodiments, the DL reference signal measurement is used for initiating a downlink RRC connection.

Thus, in some embodiments, the network, e.g. eNodeB, may determine whether a RRC uplink diversity is used, based on the quality of an uplink reference signal, wherein the quality is determined with an uplink reference signal measurement (although, for example, a downlink reference signal measurement is available). Similarly, the network, e.g. eNodeB, may determine whether a RRC downlink is used, based on the quality of a downlink reference signal, wherein the quality is determined with a downlink reference signal measurement (although, for example, an uplink measurement result for an uplink reference signal might be available).

Of course, 31 to 37 and 38 to 43 can be performed independent from each other and in some embodiments a method includes only 31 to 37 or 38 to 43.

Figure 4:
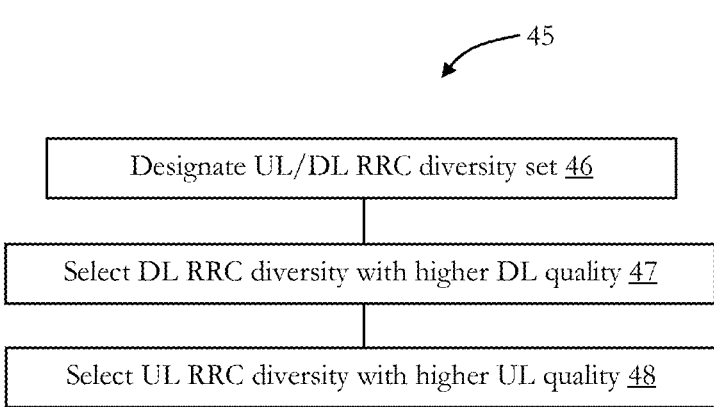
FIG. 4 illustrates a flowchart for a further mobile telecommunications system method.

In the following, an embodiment of a mobile telecommunications method 45 is discussed under reference of FIG. 4 which pertains to the selection of a RRC diversity set and which can be performed by the LTE eNodeB 3, the NR eNodeB 5 and the UE 6 of FIG. 1. Method 45 can be combined with method 20 and/or method 30.

At 46, the DL and UL RRC diversity set can be designated separately according to DL and UL link quality, respectively.

For the DL, the decision could be made by the entity, e.g. LTE eNodeB 3 or NR eNodeB 5, which receives the measurement report, as discussed above, and this entity selects at 47, for example, the entities with higher link quality as the RRC diversity set.

For the UL, the RRC diversity set could follow the DL rule or follow the UL reference signal measurement at 48 having the higher UL quality. If it follows the UL measurement results, there may be provided a "central node" which triggers to exchange the UL measurement results between the entities, e.g. eNodeBs 3 and 5 included in the RRC diversity set, if necessary. Then the central node will make the decision on the RRC diversity set.

Figure 5:
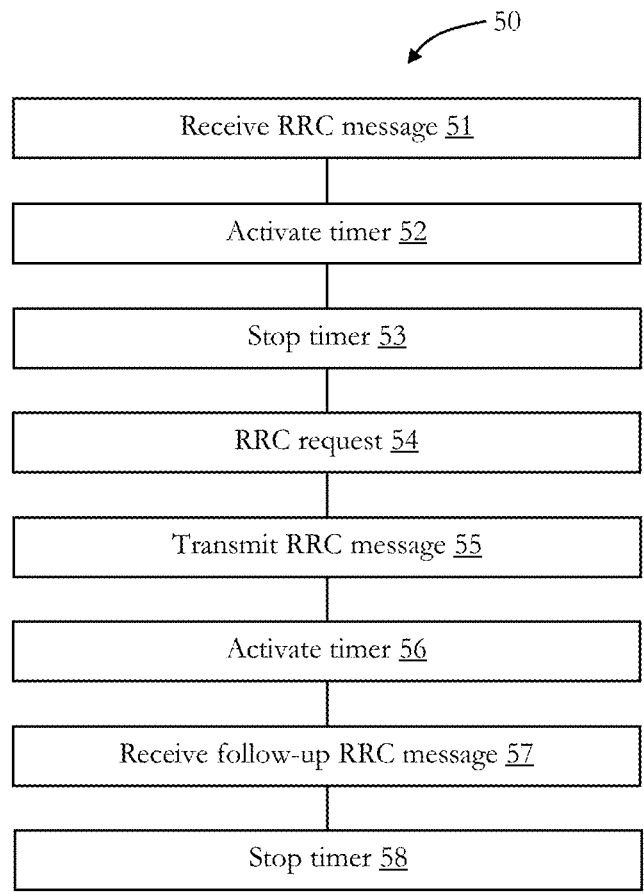
FIG. 5 illustrates a flowchart for a further mobile telecommunications system method.

In the following, an embodiment of a mobile telecommunications method 50 is discussed under reference of FIG. 5 which pertains to a RRC diversity procedure and which can be performed by the LTE eNodeB 3, the NR eNodeB 5 and the UE 6 of FIG. 1. Method 50 can be combined with method 20 and/or method 30 and/or method 45.

The RRC message described herein may include an identifier, as discussed in the following.

Each downlink RRC message for RRC diversity may contain at least an original RRC generator identifier and an additional RRC transmitter identifier(s), as also discussed above.

Each uplink RRC message for RRC diversity may contain at least a target (or serving entity, from UE point of view) RRC receiver identifier and an additional RRC receiver identifier(s), as discussed above.

For downlink RRC diversity to transmit the RRC message with a time constraint, a timer is activated at 52 after receiving a certain RRC message at 51, e.g. RRCConnectionReconfiguration, from any entity in the RRC diversity set, e.g. LTE eNodeB 3 and/or NR eNodeB 5.

The timer will be stopped at 53, if an expected behavior is performed, e.g. if a handover procedure is finished. Otherwise after the timer expires after a predetermined time period, according to its implementation or according to a pre-configuration, the UE, e.g. UE 6, will initiate at 54 a following action, for example, for initiating the RRC message transmission, such as RRCConnectionReestablishmentRequest with RRC diversity.

In the case of uplink RRC diversity for transmitting the RRC message with a time constraint, the timer is activated at 56 after the UE transmits the RRC message at 55 to all the entities in the RRC diversity set.

The timer will stop at 58, if a follow-up RRC message has been received at 57, from any entity in the RRC diversity set. Otherwise, the timer will expire accordingly after a predetermined time period.

In another embodiment, even if the RRC diversity is not triggered for the first message transmitted from the UE, the timer will stop at 58 if the follow-up RRC message has been received from an entity in the RRC diversity set other than the serving entity.

Of course, 51 to 54 and 55 to 58 can be performed independent from each other and in some embodiments a method includes only 51 to 54 or 55 to 58.

In the following, an embodiment of a mobile telecommunications method 60 is discussed under reference of FIG. 6 which pertains to RRC message generation and which can be performed by the LTE eNodeB 3, the NR eNodeB 5 and the UE 6 of FIG. 1. Method 60 can be combined with method 20 and/or method 30 and/or method 45 and/or method 50.

For the uplink RRC diversity message, if it is the additional data unit/control unit, e.g. LTE eNodeB 3/NR eNodeB 5, to receive the RRC message at 61, such as a RRCConnectionRequest, this RRC message is transmitted back at 62 to the serving data unit/control unit (serving base station, e.g. eNodeB 3 or 5) in order to process this RRC message. It is implementation and/or pre-configuration dependent, whether a follow-up message is transmitted with RRC diversity or not.

In another embodiment, or alternatively/additionally, for certain RRC messages, e.g. measurement report messages for trigging a handover, received by the entities in the RRC diversity set at 63, each entity generates separate RRC messages at 64 and transmits the generated RRC messages to the UE at 65.

In the following, an embodiment of a mobile telecommunications method 70 is discussed under reference of FIG. 7 which pertains to an acknowledgment RRC message for RRC diversity and which can be performed by the LTE eNodeB 3, the NR eNodeB 5 and the UE 6 of FIG. 1. Method 70 can be combined with method 20 and/or method 30 and/or method 45 and/or method 50 and/or method 60.

For a downlink RRC diversity message, the UE, e.g. UE 6, will send a feedback (acknowledgment) message at 72 to the serving entity (e.g. serving base station, e.g. eNodeB 3 or 5) including the type of RRC message which it has successfully received and including from which entity it was received from at 71.

On the basis of this feedback message, the serving entity, e.g. eNodeB 3 or 5, adjusts or determines the diversity set if necessary at 73.

As an alternative, or additionally, the UE 6 will send a feedback or ACK (acknowledgment) message separately to each entity at 74 from which it had received the RRC message at 71 successfully. Then the additional entity will send such ACK message to the serving entity (e.g. serving eNodeB) at 75 if necessary.

For an uplink RRC diversity message, the additional entity will send an ACK message at 78 to the serving entity (e.g. serving eNodeB) if it has successfully received at 77 the message sent from the UE at 76. On the basis of this indication, the serving entity may send the follow-up messages via this additional entity at 79.

Of course, 71 to 75 and 76 to 79 can be performed independent from each other and, in some embodiments, a method includes only 71 to 75 or 76 to 79.

Figure 8:
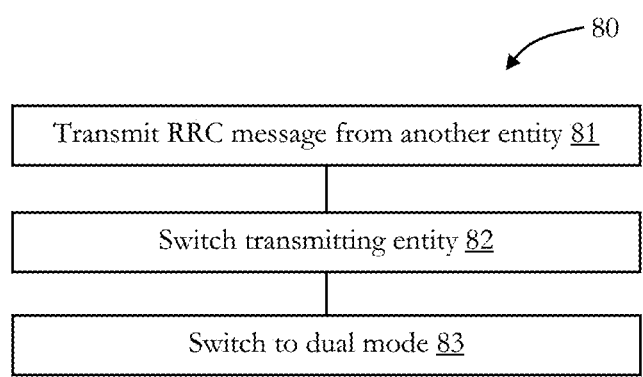
FIG. 8 illustrates a flowchart for a further mobile telecommunications system method.

In the following, an embodiment of a mobile telecommunications method 80 is discussed under reference of FIG. 8 which pertains to switching from single RRC to RRC diversity (or dual RRC) and which can be performed by the LTE eNodeB 3, the NR eNodeB 5 and the UE 6 of FIG. 1. Method 80 can be combined with method 20 and/or method 30 and/or method 45 and/or method 50 and/or method 60 and/or method 70.

At first, the switch from single RRC to dual RRC is discussed.

At 81, the dual RRC mode is automatically turned on, e.g. for tight interworking mode, wherein, for example, both the LTE eNodeB 3 and the NR eNodeB 5 transmit/receive a RRC message.

In the following, it is discussed, in which cases the RRC message as generated by each entity, e.g. LTE and NR eNodeBs 3 and 5, respectively, is sent via a single entity or both.

At first, the scenario is discussed wherein the RRC message is transmitted with a single entity, e.g. with the LTE eNodeB 3.

For transmitting the RRC message generated from another RRC entity than the LTE eNodeB 3, e.g. NR eNodeB 5, the RRC message from the other RRC entity, e.g. NR RRC message, is transmitted by the LTE eNodeB 3 at 81. In some embodiments, the own RRC message (e.g. LTE RRC message) and the other RRC message, e.g. NR RRC message, are transmitted as a common RRC message at 81.

Moreover, in the case that the RRC messages are transmitted by a single entity, the entity which transmits the RRC messages may be switched at 82.

The switching conditions may be at least one of the following.

1) The switching may be based on a link quality. For example, the RRC message will be transmitted by the radio link which has a good link quality, in particular, when a UE is experiencing a bad radio link quality with a certain entity.

2) The switching may be based on a better/wider coverage of an entity. For example, the RRC message will be transmitted by the entity which has a wider coverage, in particular, when an entity has a narrow coverage, e.g. a narrow beam coverage.

3) The switching may be based on a UE mobility state. For example, for a UE moving with a high mobility (e.g. high velocity), it is preferred that the RRC message is transmitted by a "stable" entity, e.g. an entity which has a wider coverage, better link quality, which moves together with the entity e.g. a relay or the like.

Secondly, the scenario is discussed wherein the RRC message is transmitted with both entities, e.g. with the LTE eNodeB 3 and the NR eNodeB 5.

Also here, the transmission of the RRC message via both entities at 81 includes to transmit the RRC message generated from its own and from the other entity. The conditions for switching into the dual mode at 83 include at least one of the following:

1) The switching into the dual RRC diversity mode may be based on the link quality, for example, in the case that both entities have good link quality with the UE.

2) The switching into the dual RRC diversity mode may be based on the coverage of the entity, for example, in the case that both entities have a good/stable coverage.

The switch from single RRC to RRC diversity has already been discussed and several triggers for turning on the RRC diversity have been mentioned. In cases where the RRC diversity trigger is not satisfied, the method/system will fall back into single RRC mode or into dual RRC mode, if possible.

In some embodiments, the above discussed switch criteria and/or trigger for RRC diversity criteria are applied in at least one of the following switching scenarios:

1. Switch from single RRC to the other single RRC. 2. Switch from dual RRC (with different RRC messages) to single RRC, and vice versa.

3. Switch from RRC diversity (with same RRC messages) to single RRC, and vice versa.

Another aspect of the present disclosure pertains to different handover cases which can be addressed with RRC diversity. For instance, FIG. 1 of 3GPP document R2-132469, "Performance of Control Plane Diversity", 3GPP TSG-RAN2 #83 Meeting, Barcelona, Spain, August 19th-23th, 2013, illustrates multiple handover cases, for which in principle RRC diversity may be used as will also be discussed in the following.

Before discussing embodiments of the disclosure, some general guidelines are given for the deployment of New Radio Access Technology (NR RAT) as it may be used in some embodiments.

In the following some deployment scenarios are discussed which are assumed for the New Radio Access Technology and some guidelines for designing the radio interface protocols for the New Radio Access Technology are given.

Figure 9:
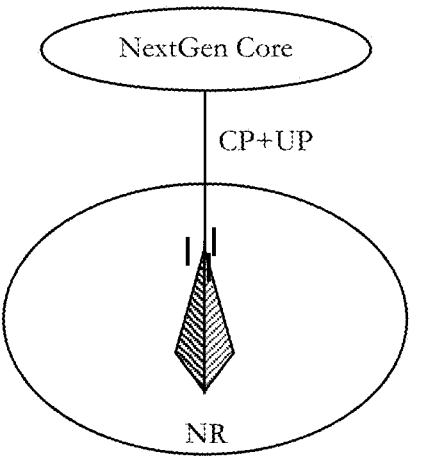
FIG. 9 illustrates control plane and user plane communication between a new radio cell and the next generation core network.

In a first scenario, which is also illustrated in FIG. 9, a NR eNodeB establishes a NR cell and communicates over the control plane CP and the user plane UP with the next generation core network (CN) NextGen Core.

In terms of cell layout, the following scenarios may be assumed for a standalone NR. A homogeneous deployment can be used, where all cells provide the similar coverage, e.g. macro or small cell only. Also a heterogeneous deployment can be used, where cells of different sizes are overlapped, e.g. macro and small cells.

In terms of CN-RAN (core network-radio access network) connection, the scenario as illustrated in FIG. 9 can be employed, where, as mentioned, the NR base station, e.g. NR eNodeB, is connected to the NextGen Core.

Figure 10:
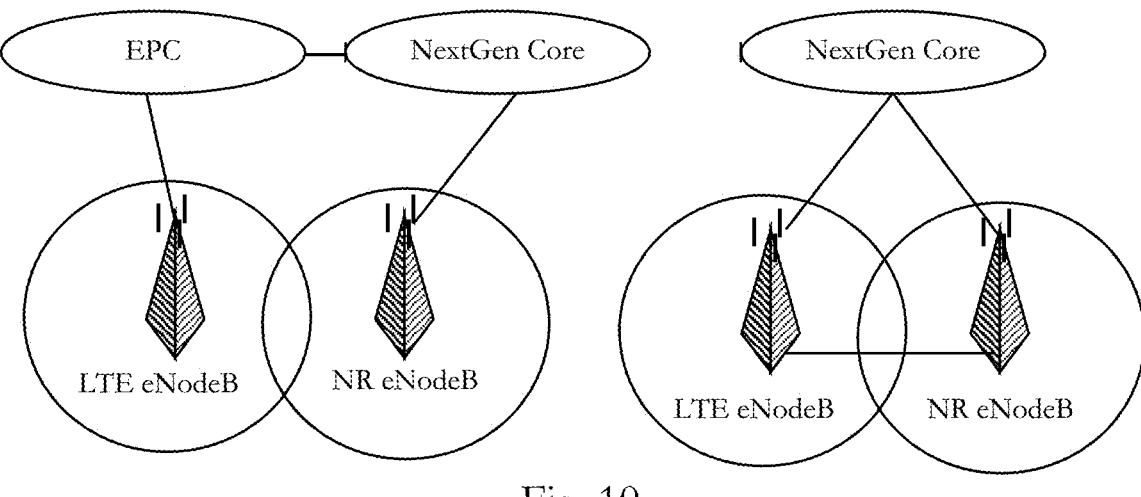
FIG. 10 illustrates aggregation of LTE and NR.

FIG. 10 illustrates two further scenarios for a standalone NR eNodeB, wherein an inter-RAT mobility is assumed between NR and LTE.

On the left side of FIG. 10, a LTE eNodeB is connected to the EPC (evolved packet core) and a NR eNodeB is connected to the NextGen Core, wherein some communication can be provided between the EPC and the NextGen Core.

On the right side of FIG. 10, both the LTE eNodeB and the NR eNodeB are connected to the NextGen Core and the base stations, LTE eNodeB and NR eNodeB, can communicate with each other.

In the following, LTE-NR aggregation for tight interworking is discussed.

Figure 11:
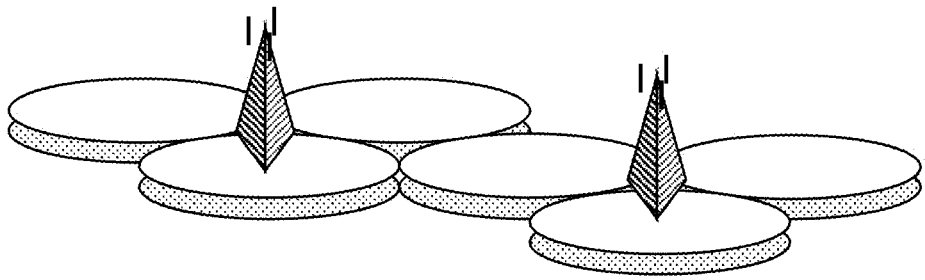
FIG. 11 illustrates co-location of LTE and NR cells.

FIG. 11 shows deployment scenarios in terms of cell layout and eNodeB location which can be used for LTE-NR aggregation.

FIG. 11 illustrates a scenario wherein both LTE (white discs) and NR cells (hashed discs) are overlaid and co-located providing a similar coverage. Both LTE and NR cells may be macro or small cells.

Figure 12:
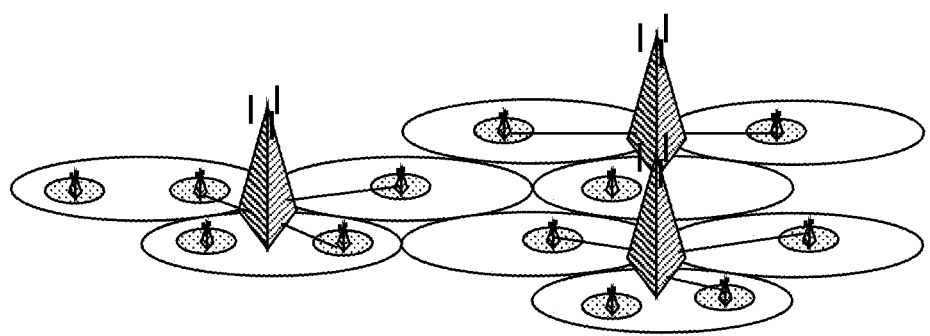
FIG. 12 illustrates co-location and non-co-location of LTE and NR cells.

FIG. 12 illustrates another scenario wherein LTE (white discs) and NR cells (hashed discs) are overlaid, and co-located (NR eNodeB communicates with LTE eNodeB illustrated by respective lines) or not co-located, wherein the coverage of LTE cells and NR cells is different. A co-located cell refers to a small cell together with a macro cell for which the respective eNodeB is installed at the same location. A non-co-located cell refers to a small cell together with a macro cell for which the respective eNodeB is installed at the different location. In the example of FIG. 12, LTE serves macro cells and NR serves small cells. Of course, the opposite scenario is also possible.

Figure 13:
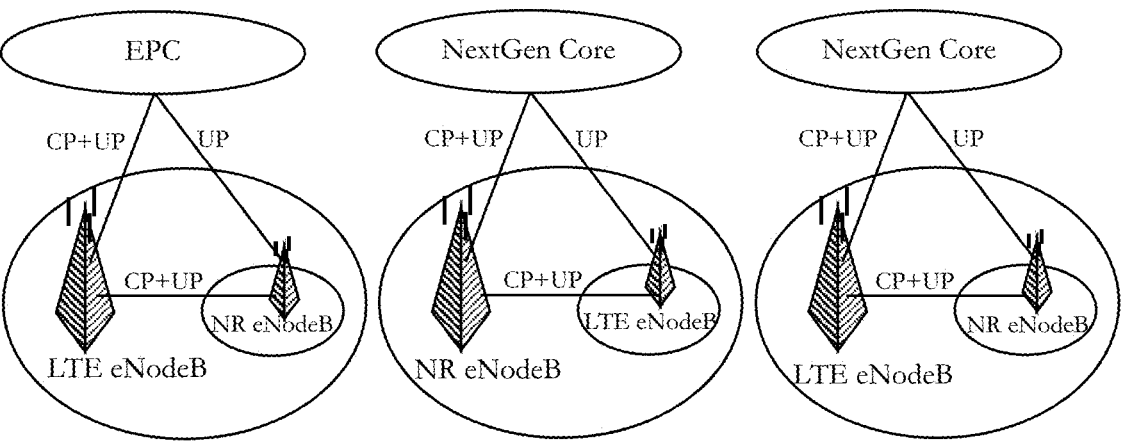
FIG. 13 illustrates different deployment scenarios of LTE-NR aggregation.

FIG. 13 illustrates three different deployment scenarios in terms of CN-RAN connection which may be used for LTE-NR aggregation in some embodiments.

On the left side of FIG. 13, a NR cell is tightly integrated in LTE via the EPC. The LTE eNodeB and the NR eNodeB communicate with the EPC, wherein the LTE eNodeB performs control plane CP and user plane UP communication with the EPC and the NR eNodeB performs only user plane UP communication with the EPC. The LTE eNodeB and the NR eNodeB can perform control plane CP and user plane UP communication with each other.

In the middle of FIG. 13, a LTE cell is tightly integrated in a NR cell via the NextGen Core. The LTE eNodeB and the NR eNodeB communicate with the NextGen Core, wherein the NR eNodeB performs control plane CP and user plane UP communication with the NextGen Core and the LTE eNodeB performs only user plane UP communication with the NextGen Core. The LTE eNodeB and the NR eNodeB can perform control plane CP and user plane UP communication with each other.

On the right side of FIG. 13, a NR cell is tightly integrated in a LTE cell via NextGen Core. The LTE eNodeB and the NR eNodeB communicate with the NextGen Core, wherein the LTE eNodeB performs control plane CP and user plane UP communication with the NextGen Core and the NR eNodeB performs only user plane UP communication with the NextGen Core. The LTE eNodeB and the NR eNodeB can perform control plane CP and user plane UP communication with each other.

Hence, in all three scenarios, there exists one C-plane connection between the core network CN and the RAN. U-plane data UP is routed to the RAN directly through the CN on a bearer basis (line marked with UP in FIG. 13). Alternatively, the U-plane data can be included in the same bearer as the control plane data CP at the RAN, wherein the bearer is split accordingly (see line CP+UP between the eNodeBs).

Consequently, some embodiments pertain to a mobile telecommunications system method for providing a radio resource control connection to a user equipment, wherein the mobile telecommunications system comprises at least two cells, wherein the first cell is based on a first radio access technology and the second cell is based on a second radio access technology, the method comprising transmitting a first radio resource control message from the first cell to the user equipment; transmitting a second radio resource control message from the second cell to the user equipment; and providing the radio resource control connection based on at least one of the first radio resource control message and the second radio resource control message. The method may be performed by a LTE base station, a NR base station and a user equipment as described herein. The radio resource control message may be a handover message, a radio resource control re-establishment message or a radio resource control reconfiguration message and the provided radio resource control connection may be at least one of: handover, RRC re-establishment and RRC reconfiguration.

As discussed above, the radio access technology may be LTE, LTE-A or NR and, thus, the first/second cell may be a LTE cell or NR cell which are established by a LTE base station and a NR base station, respectively, such as a LTE eNodeB and a NR eNodeB.

The handover messages are RRC messages and, thus, RRC diversity, as also discussed, may be implemented.

The first and second radio resource control messages may include different configurations, such as different handover commands or the like, which are transmitted via the first and second and, thus, different RAT cells. The UE may perform handover, based on the handover (radio resource control) message which was received. For example, it may happen that the UE does not receive the first or second radio resource control (e.g. handover) message, since, for example, it has already left the coverage of the associated cell. Moreover, the UE may decide, which radio resource control message, e.g. the first or second radio resource control (e.g. handover) message, is used for performing the handover, in case that both the first and second radio resource control (e.g. handover) messages have been received, as will also be discussed in the following. For example, a configuration included in the first or second radio resource control message may be prioritized.

Hence, in some embodiments, by providing a first and second radio resource control (e.g. handover) message, a fallback mechanism is provided which may reduce service interruption due to handover failure under challenging conditions.

In some embodiments, if the first radio resource control message and the second radio resource control message are received from the user equipment, it is determined whether to perform handover based on the first or second radio resource control (e.g. handover) message, based on at least one of: cell coverage, beam coverage, and mobility state of the user equipment.

In some embodiments, the first cell is a macro cell (e.g. LTE cell), wherein the first radio resource control message includes handover configuration data for a third cell located in the first cell. The third cell may be based on the RAT of the second cell and may be, for example, a NR cell, which has a coverage that is smaller than the coverage of the first cell.

In some embodiments, the first cell is a macro cell, wherein the first radio resource control message includes handover configuration for a third cell, wherein the third cell is based on the radio access technology of the first cell. The third cell may also be a macro cell, e.g. a LTE cell such as the first cell.

In some embodiments, the second cell is a small cell, wherein the second radio resource control message includes handover configuration data for a fourth cell, wherein the fourth cell is based on the radio access technology of the second cell.

In some embodiments, the first radio resource control message indicates a first beam and the second radio resource control message indicates a second beam, wherein the first beam is wider than the second beam.

Returning back to FIG. 14, there is illustrated a RAN 90 (similar to RAN 1 of FIG. 1) using a deployment scenario among the multiple deployment scenarios discussed above, which requires a dual connection to both LTE and NR.

In this scenario, a UE 6 (see also FIG. 1) is connected to an LTE macro cell 92 which is established by a LTE eNodeB 93 and which may provide a primary control plane functionality (e.g. similar to PCell).

Figure 14:
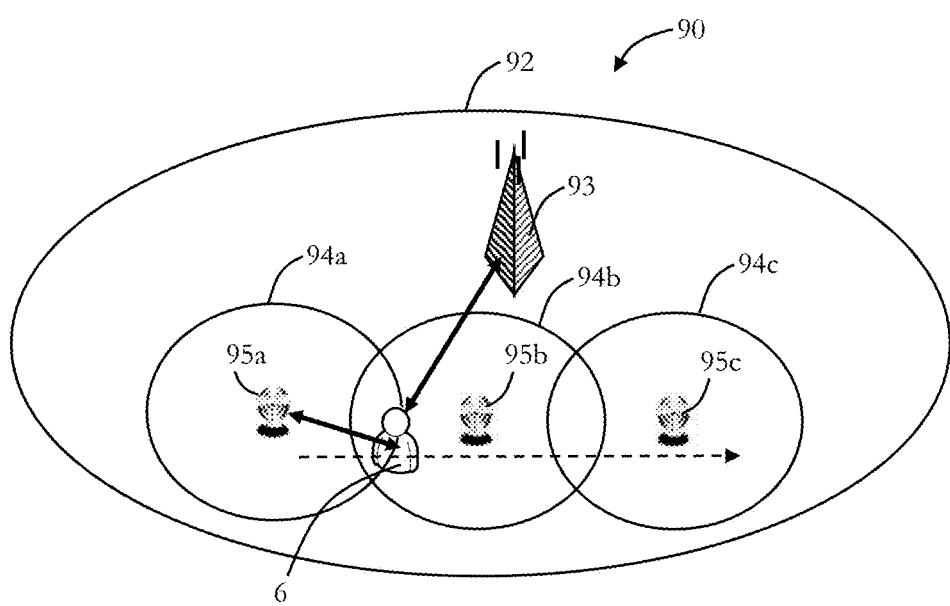
FIG. 14 illustrates handover for a UE moving through NR cells located in a LTE cell.

The UE 6 is also connected to one or more NR cells, wherein FIG. 14 illustrates three NR cells 94a, 94b and 94c which are each established by NR eNodeBs 95a, 95b and 95c, respectively, and which each provide a necessary bandwidth for high user plane throughput (e.g. similar to SCell).

The NR cells 94a-c may also include more than one TRP/DU (transmission reception point/distributed unit) connected to a single CU (control unit).

In this simple mobility scenario, the UE 6 remains under the coverage of the same LTE cell 92, while passing through the coverage of multiple NR small cells, such as the three NR cells 94a-c (see dashed arrow indicating the path taken by the UE 6).

Figure 15:
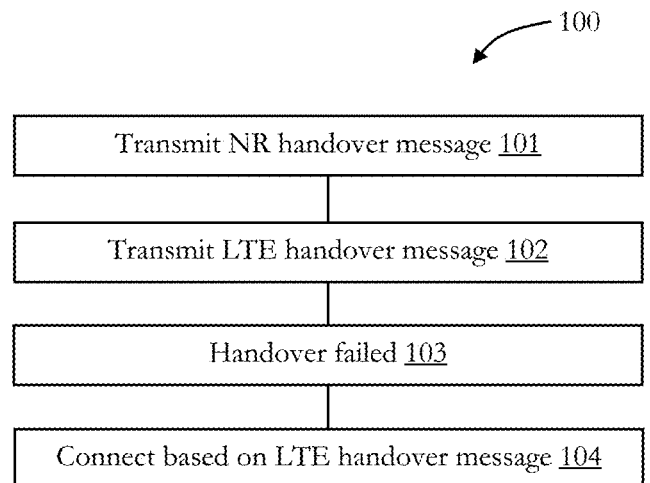
FIG. 15 illustrates a flowchart for a further mobile telecommunications system method.

In the present embodiment, a mobile telecommunications system method 100, illustrated in FIG. 15, is performed by the eNodeBs 93 and 95a-c and the UE 6.

RRC messages, i.e. handover messages in this embodiment, for NR and LTE are transmitted by both radio links. Hence, in the present embodiment, a handover configuration may be transmitted with a NR handover message by the first NR cell 94a at 101, to configure a handover (or alternatively a radio link addition—adding a connection for the second NR small cell) to the second NR small cell 94b, while maintaining the connection to the LTE cell 92.

At high speed, the probability for handover failure may be higher, in particular in the case of small cells, such as NR cells 94a-c, since the UE 6 may pass through the coverage of multiple small cells quickly.

Hence, there is a chance that the handover message does not reach the UE 6 from the first NR cell 94a, or that the handover complete message is not received by the second NR cell 94b, while UE 6 travels through the cells 94a and 94b.

Hence, in the present embodiment, the LTE cell 92, i.e. LTE eNodeB 93, also transmits a handover message at 102 to the UE 6 on the LTE radio. The handover message transmitted at 102 additionally provides a configuration for the third NR cell 94c.

Hence, in the case that the UE 6 fails to connect to the second NR cell 94b at 103, for whatever reason, it then attempts to connect to the third NR cell 94c at 104, based on the LTE handover message.

It is likely that the LTE handover message transmitted via LTE takes a longer time to be received from the UE 6, e.g. due to lower supported bitrate. Therefore, if the initial handover fails, the following handover will be received at a slightly later time and the UE 6 may have moved during this time to the third NR cell 94c.

Figure 16:
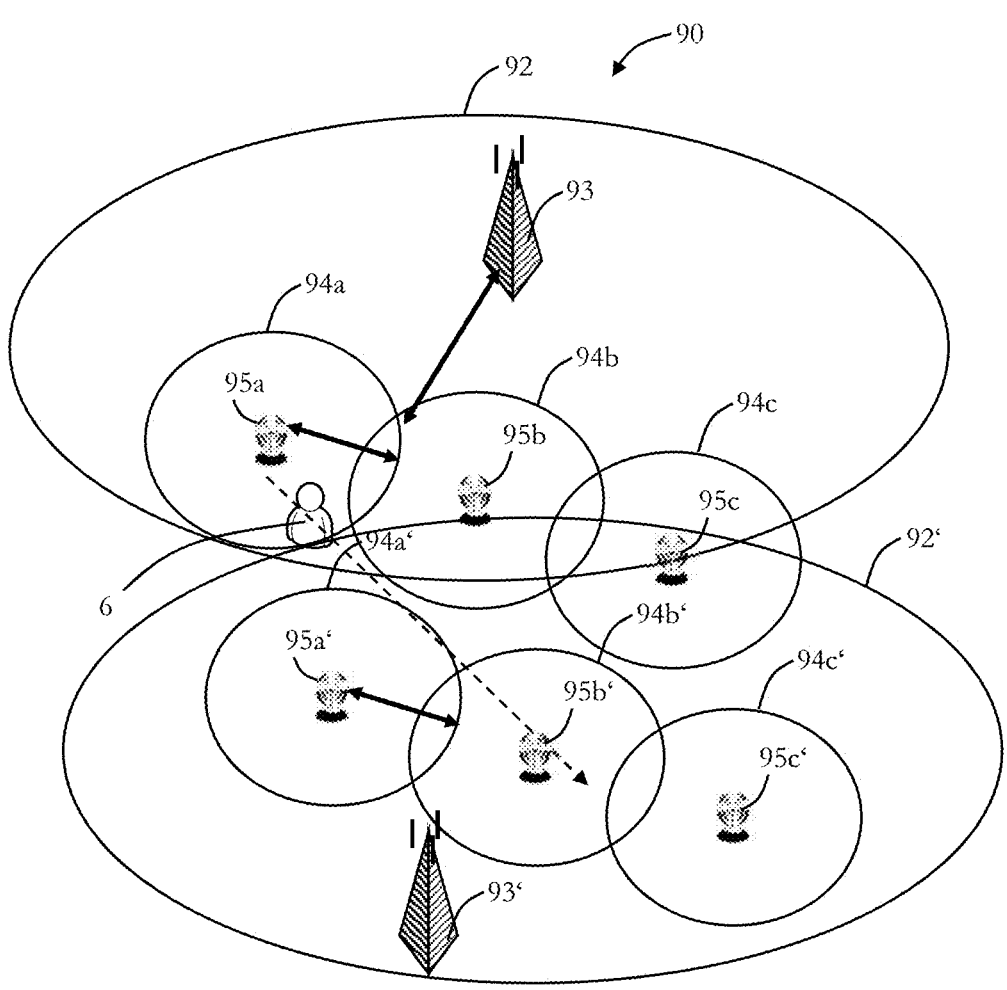
FIG. 16 illustrates a handover for a UE moving through NR cells located in a LTE cell to another LTE cell with NR cells.

Another embodiment is illustrated in FIG. 16, where the RAN 90 basically corresponds to the RAN 90 of FIG. 14 with the difference that a second LTE cell 92' is present, which is established by a second LTE eNodeB 93' and that three NR cells 94a' to 94c' are present, which are each established by a NR eNodeB 95a', 95b' and 95c', respectively.

The UE 6 is located at the border between the two LTE cells 92 and 92'.

Figure 17:
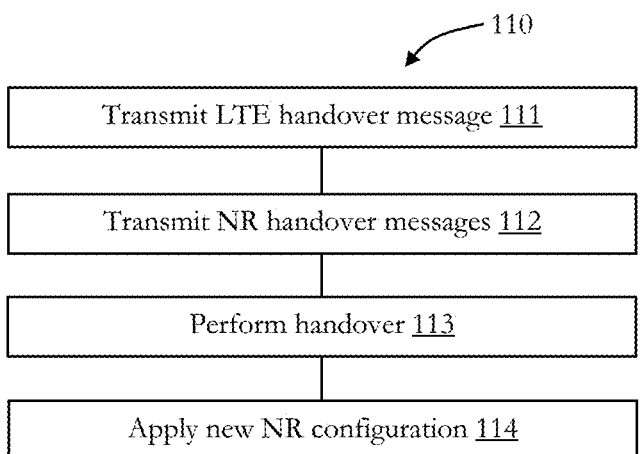
FIG. 17 illustrates a flowchart for a further mobile telecommunications system method.

FIG. 17 illustrates a mobile telecommunications system method 110, which can be performed by the components of RAN 90 of FIG. 16 and which can be combined with method 100 discussed above. Without limiting the present disclosure, the following embodiment is based on radio resource control messages being handover messages.

LTE cell 92 transmits at 111 a handover message including handover configurations between LTE cells, namely between LTE cell 92 and LTE cell 92'. Optionally the LTE handover messages may also configure some of the NR small cells, e.g. 94a', 94b' or 94c'.

Moreover, the NR cell(s), e.g. 94a and 94b transmit NR handover messages at 112 which configure NR neighbor cells for handover, such as NR cells 94b' and 94c'.

At 113, UE 6 performs a LTE handover, based on the LTE handover command included in the handover message transmitted at 111.

In this embodiment, the NR cell configuration may be different, and the UE 6 may apply a new NR configuration for NR cells at 114, once the LTE handover is completed, for example, by effectively combining information from the different handover commands.

Figure 18:
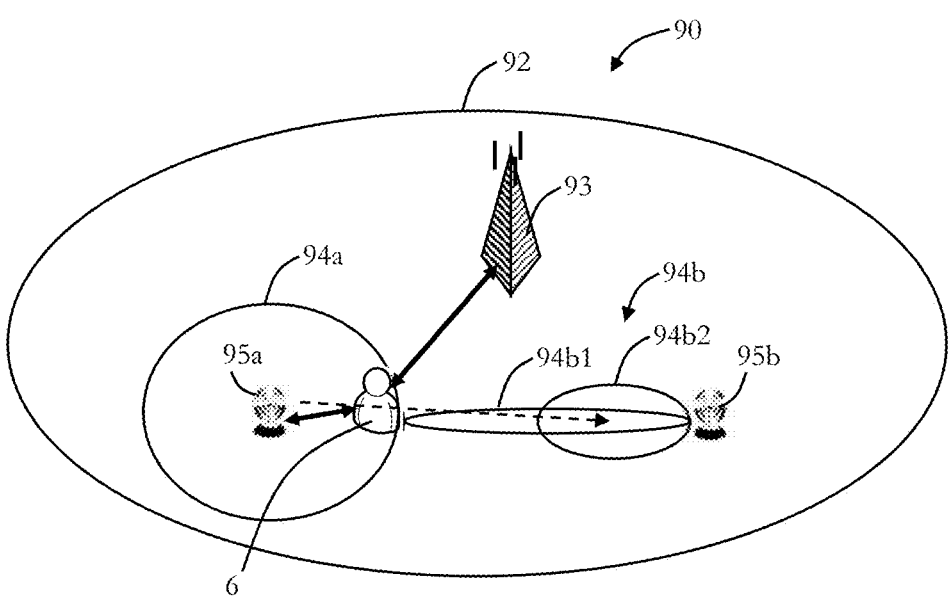
FIG. 18 illustrates a handover for a NR cell having different beams.

Another embodiment is illustrated in FIG. 18, wherein the RAN 90 basically corresponds to RAN 90 of FIG. 14 with the difference that the NR cell 94b is formed by two beams, namely the first beam 94b1 which is narrow and lengthy compared to the second beam 94b2 which is wide and short (compared to the first beam 94b1).

In this embodiment, the NR cell 94b provides a more challenging configuration due to the beams 94b1 and 94b2, wherein the LTE cell 92 provides a less challenging configuration, since it is large.

Figure 19:
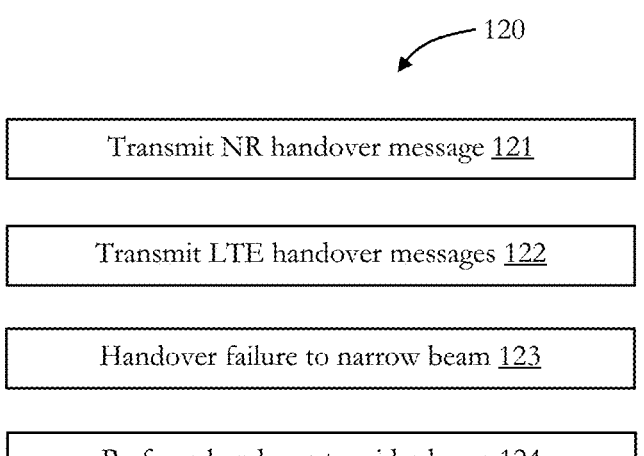
FIG. 19 illustrates a flowchart for a further mobile telecommunications system method.

FIG. 19 illustrates a mobile telecommunications system method 120, which can be performed by the components of RAN 90 of FIG. 18 and which can be combined with methods 100 and 110 discussed above. Without limiting the present disclosure, the following embodiment is based on radio resource control messages being handover messages.

For example, the NR cell 94a may attempt to handover the UE 6 to the relatively narrow beam 94b1 of the NR cell 94b by transmitting a respective NR handover message at 121. While the narrow beam 94b1 may provide, for example, a higher throughput, connecting to this narrow beam 94b1 is more challenging in a mobility scenario. Therefore, the LTE cell 92 provides a configuration for a wider beam, e.g. 94b2, by transmitting a respective LTE handover message at 122. The LTE handover message can be used by the UE 6 in the case of failure at 123 to connect to the narrow beam 94b1, wherein the UE 6 performs handover to the wider beam 94b2 at 124 upon detection of the handover failure at 123. While this wider beam 94b2 provides less throughput than if the UE 6 had connected to the narrower beam 94b1, the service can continue at a far higher quality than if the UE 6 simply fails the handover and has to perform a recovery procedure, or if the UE 6 has to fallback to LTE U-plane.

In another embodiment, the handover command included in a NR handover message transmitted via a NR cell provides a configuration for one or more specific cells, while the LTE handover message including a LTE handover command attempts to configure additional cells that may be used in the case that the UE is unable to connect to any of the cells provided in the NR handover message. This may occur, for example, when the precise location and direction of the UE cannot be estimated with precision.

Figure 20:
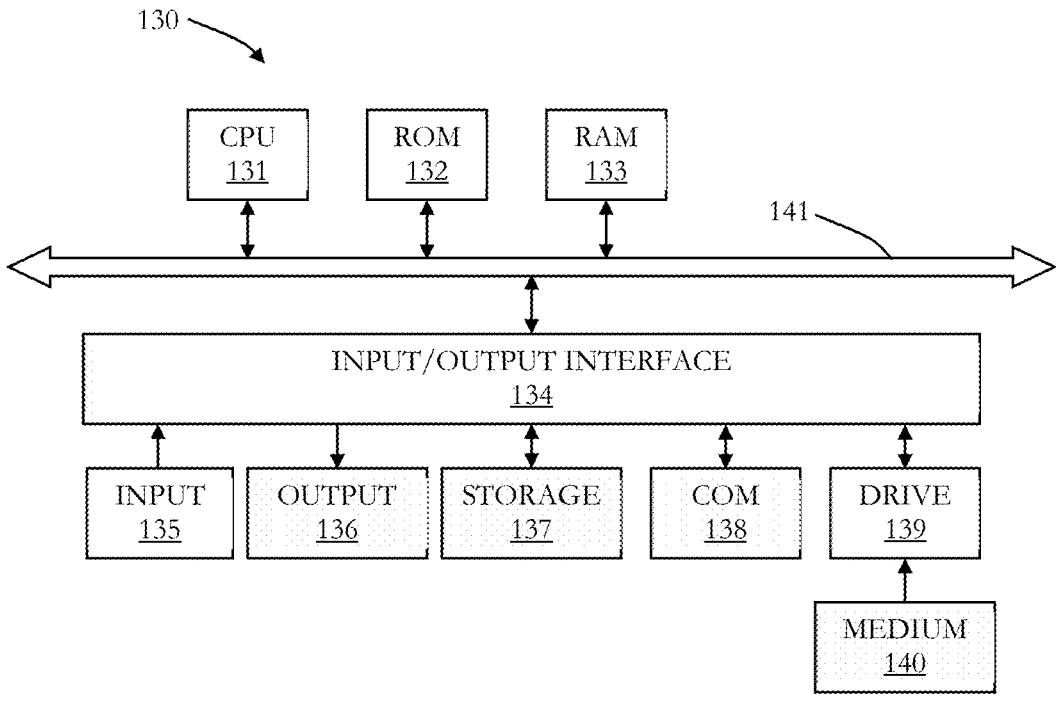
FIG. 20 illustrates inclusion of a multi-purpose computer.

In the following, an embodiment of a general purpose computer 130 is described under reference of FIG. 20. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment and at least another base station, wherein the circuitry is further configured to:

configure a radio resource control message for radio resource control diversity; and transmit the configured radio resource control message to the user equipment or to receive a configured radio resource control message from the user equipment and the at least another base station.

(2) The base station of (1), wherein the radio resource control message is associated with at least one of: handover, radio resource control establishment, radio resource control re-establishment, radio resource control connection suspend and radio resource control connection resume.

(3) The base station of (1) or (2), wherein the circuitry is further configured to turn on/off the radio resource control diversity or to turn on/off the radio resource control diversity for specific radio resource control messages.

(4) The base station of (3), wherein the circuitry is further configured to turn on/off the radio resource control diversity, based on the configured radio resource control message.

(5) The base station of (3) or (4), wherein the circuitry is further configured to turn on/off the radio resource control diversity, based on the user equipment to which the configured radio resource control message is transmitted.

(6) The base station of anyone of (3) to (5), wherein the circuitry is further configured to transmit an instruction message to the user equipment for turning on/off radio resource control diversity or to turn on/off the radio resource control diversity for specific radio resource control messages.

(7) The base station of anyone of (1) to (6), wherein radio resource control diversity is initiated, based on an uplink reference signal measurement, and wherein the radio resource control diversity is performed for a downlink communication or an uplink communication.

(8) The base station of (7), wherein the circuitry is further configured to configure the user equipment for sending at least one of feedback signals and uplink reference signals.

(9) The base station of (8), wherein the circuitry is further configured to define a radio resource control configuration, based on the received at least one of feedback signals and uplink reference signals.

(10) The base station of anyone of (1) to (9), wherein the radio resource control diversity is initiated, based on a downlink reference signal measurement, and wherein the radio resource control diversity is performed for an uplink communication or a downlink communication.

(11) The base station of anyone of (1) to (10), wherein the circuitry is further configured to determine at least one of a downlink radio resource control diversity set and an uplink radio resource control diversity set.

(12) The base station of (11), wherein circuitry is further configured to determine the downlink radio resource control diversity set based on a downlink quality or to determine the uplink radio resource control diversity set based on an uplink quality.

(13) The base station of anyone of (1) to (12), wherein the configured radio resource control message includes at least one of original radio resource control message generator identifier and additional radio resource control transmitter identifier.

(14) The base station of anyone of (1) to (13), wherein the circuitry is further configured to transmit the configured radio resource control message repeatedly.

(15) The base station of (14), wherein the repeated transmission of the configured radio resource control message is set in response to receipt of a radio resource control message.

(16) The base station of anyone of (14) to (15), wherein the repeated transmission is terminated in response to a predetermined event or after a predetermined time period.

(17) The base station of anyone of (1) to (16), wherein a timer is started after transmission of the configured radio resource control message.

(18) The base station of (17), wherein the timer expires after a predetermined time period.

(19) The base station of anyone of (17) to (18), wherein the timer is stopped in in response to a received radio resource control message.

(20) The base station of (1) or (19), wherein a predetermined action is performed after expiration of the timer.

(21) The base station of anyone of (1) to (20), wherein the circuitry is further configured, in case that the base station does not serve the user equipment, to transmit a received radio resource control message to another base station serving the user equipment.

(22) The base station of anyone of (1) to (21), wherein the circuitry is further configured, in case that the base station does not serve the user equipment, to transmit an acknowledgement message to another base station serving the user equipment in response to a radio resource control message received from a user equipment.

(23) The base station of anyone of (1) to (22), wherein the circuitry is further configured to receive a configured radio resource control message from another base station and to transmit a common radio resource control message.

(24) The base station of (23), wherein the common radio resource control message is transmitted based on at least one of the following conditions: link quality, coverage, mobility state of the user equipment.

(25) A user equipment for a mobile telecommunications system comprising circuitry configured for radio resource control diversity communication, wherein the circuitry is further configure to:

receive at least two radio resource control messages, which are configured for radio resource control diversity communication.

(26) The user equipment of (25), wherein the circuitry is further configured to turn on/off the radio resource control diversity communication, based on an instruction message received from a base station.

(27) The user equipment of (25) or (26), wherein the circuitry is further configured to turn on/off the radio resource control diversity communication, based on a radio resource control establishment.

(28) The user equipment of anyone of (25) to (27), wherein the circuitry is further configured to turn on/off the radio resource control diversity communication, if the user equipment is located at a cell boundary.

(29) The user equipment of anyone of (25) to (28), wherein the circuitry is further configured to turn on/off the radio resource control diversity communication, if a radio link failure is detected.

(30) The user equipment of anyone of (25) to (29), wherein the circuitry is further configured to receive the at least two radio resource control messages based on a radio resource control diversity set received from a base station.

(31) The user equipment of anyone of (25) to (30), wherein the circuitry is further configured to transmit a radio resource control message including at least one of a target radio resource control receiver identifier and additional radio resource control receiver identifier.

(32) The user equipment of anyone of (25) to (31), wherein the circuitry is further configured to transmit an acknowledgment message in response to receiving the radio resource control messages.

(33) The user equipment of (32), wherein the acknowledgment message includes at least one of an indication about the type of received radio resource control messages and an indication about the origin of the received radio resource control messages.

(34) A mobile telecommunications system method for providing a radio resource control connection to a user equipment, wherein the mobile telecommunications system comprises at least two cells, wherein the first cell is based on a first radio access technology and the second cell is based on a second radio access technology, the method comprising:

transmitting a first radio resource control message from the first cell to the user equipment;

transmitting a second radio resource control message from the second cell to the user equipment; and performing handover based on at least one of the first radio resource control message and the second radio resource control message.

(35) The mobile telecommunications system method of (34), wherein the radio resource control message is a handover message, a radio resource control re-establishment message or a radio resource control reconfiguration message.

(36) The mobile telecommunications system method of (34) or (35), wherein, if the first radio resource control message and the second radio resource control message are received from the user equipment, it is determined whether to perform handover based on the first or second radio resource control message, based on at least one of: cell coverage, beam coverage, and mobility state of the user equipment.

(37) The mobile telecommunications system method of (34) or (35), wherein the first cell is a macro cell and wherein the first radio resource control message includes handover configuration data for a third cell located in the first cell.

(38) The mobile telecommunications system method of anyone of (34) to (36), wherein the first cell is a macro cell and wherein the first radio resource control message includes handover configuration for a third cell, wherein the third cell is based on the radio access technology of the first cell.

(39) The telecommunications system method of (38), wherein the second cell is a small cell and wherein the second radio resource control message includes handover configuration data for a fourth cell, wherein the fourth cell is based on the radio access technology of the second cell.

(40) The telecommunications system method of anyone of (34) to (39), wherein the first radio resource control message indicates a first beam and the second radio resource control message indicates a second beam, wherein the first beam is wider than the second beam.

The invention claimed is:

1. A base station for a mobile telecommunications system comprising:

circuitry configured to communicate with at least one user equipment and at least another base station, configure a radio resource control message for radio resource control diversity;

transmit the configured radio resource control message to the user equipment or receive a configured radio resource control message for radio resource control diversity communication from the user equipment and the at least another base station;

transmit to the user equipment and the at least another base station a notification of a diversity set including base stations to be used for radio resource control diversity communication, the diversity set including an uplink diversity set and a downlink diversity set that is determined separately from the uplink diversity set; and transmit the configured radio resource control message repeatedly in response to receipt of a predetermined message from the user equipment.

2. The base station of claim 1, wherein the radio resource control message is associated with at least one of: handover, radio resource control establishment, radio resource control re-establishment, radio resource control connection suspend and radio resource control connection resume.

3. The base station of claim 1, wherein the circuitry is configured to turn on or off the radio resource control diversity or to turn on or off the radio resource control diversity for specific radio resource control messages.

4. The base station of claim 3, wherein the circuitry is configured to turn on or off the radio resource control diversity, based on the configured radio resource control message.

5. The base station of claim 3, wherein the circuitry is configured to turn on or off the radio resource control diversity, based on the at least one user equipment to which the configured radio resource control message is transmitted.

6. The base station of claim 3, wherein the circuitry is configured to transmit an instruction message to the at least one user equipment for turning on/off radio resource control diversity or to turn on or off the radio resource control diversity for specific radio resource control messages.

7. The base station of claim 1, wherein radio resource control diversity is initiated, based on an uplink reference signal measurement, and wherein the radio resource control diversity is performed for a downlink communication or an uplink communication.

8. The base station of claim 7, wherein the circuitry is configured to configure the at least one user equipment for sending at least one of feedback signals and uplink reference signals.

9. The base station of claim 8, wherein the circuitry is configured to define a radio resource control configuration, based on the received at least one of feedback signals and uplink reference signals.

10. The base station of claim 1, wherein the radio resource control diversity is initiated, based on a downlink reference signal measurement, and wherein the radio resource control diversity is performed for an uplink communication or a downlink communication.

11. A user equipment for a mobile telecommunications system comprising:

circuitry configured to communicate via radio resource control diversity communication, receive or transmit at least two radio resource control messages, which are configured for radio resource control diversity communication, receive or transmit a notification of a diversity set including base stations to be used for radio resource control diversity communication, the diversity set including an uplink diversity set and a downlink diversity set that is determined separately from the uplink diversity set, and transmit or receive a radio resource control message repeatedly in response to transmission of a predetermined message from the user equipment to a base station.

12. The user equipment of claim 11, wherein the circuitry is configured to turn on or off the radio resource control diversity communication, based on an instruction message received from a base station.

13. The user equipment of claim 11, wherein the circuitry is configured to turn on or off the radio resource control diversity communication, based on a radio resource control establishment.

14. The user equipment of claim 11, wherein the circuitry is configured to turn on or off the radio resource control diversity communication in a case that the user equipment is located at a cell boundary.

15. The user equipment of claim 11, wherein the circuitry is configured to turn on or off the radio resource control diversity communication in a case that a radio link failure is detected.

16. The user equipment of claim 11, wherein the circuitry is configured to receive the at least two radio resource control messages based on a radio resource control diversity set received from a base station.

17. The user equipment of claim 11, wherein the circuitry is configured to transmit a radio resource control message including at least one of a target radio resource control receiver identifier and additional radio resource control receiver identifier.

18. The user equipment of claim 11, wherein the circuitry is configured to transmit an acknowledgment message in response to receiving the radio resource control messages.

19. The user equipment of claim 18, wherein the acknowledgment message includes at least one of an indication about the type of received radio resource control messages and an indication about the origin of the received radio resource control messages.

\* \* \* \* \*